US010100801B2

(12) United States Patent
King

(10) Patent No.: US 10,100,801 B2
(45) Date of Patent: Oct. 16, 2018

(54) AUXILIARY HEATING SYSTEM

(71) Applicant: Ray King, Pickering (CA)

(72) Inventor: Ray King, Pickering (CA)

(73) Assignee: Ray King, Pickering, Ontario (CA)

( * ) Notice: Subject to any disclaimer, the term of this patent is extended or adjusted under 35 U.S.C. 154(b) by 0 days.

(21) Appl. No.: 14/809,092

(22) Filed: Jul. 24, 2015

(65) Prior Publication Data

US 2016/0032882 A1 Feb. 4, 2016

(51) Int. Cl.
| | |
|---|---|
| *F02N 19/10* | (2010.01) |
| *B23P 15/26* | (2006.01) |
| *F28F 1/32* | (2006.01) |
| *B60L 1/02* | (2006.01) |
| *F02P 19/02* | (2006.01) |

(52) U.S. Cl.
CPC ............ *F02N 19/10* (2013.01); *B60L 1/02* (2013.01); *B60L 2240/34* (2013.01); *B60L 2240/36* (2013.01); *F01P 2060/18* (2013.01); *F02P 19/02* (2013.01)

(58) Field of Classification Search
CPC ... B23P 15/26; F28F 1/32; F28F 9/013; F28F 9/00; F28F 9/001; F28F 9/26; F28F 9/007; F28F 1/00; F28D 15/0275; F28D 1/04; F28D 1/0443
See application file for complete search history.

(56) References Cited

U.S. PATENT DOCUMENTS

| | | | | |
|---|---|---|---|---|
| 4,338,891 A * | 7/1982 | Blitz | .................. | B60H 1/00492 123/41.31 |
| 4,632,306 A * | 12/1986 | Bleeker | ................ | B60H 1/2203 138/42 |
| 4,770,134 A * | 9/1988 | Foreman | ................. | F02N 19/10 123/142.5 R |
| 5,048,753 A * | 9/1991 | Kellie | ................ | B60H 1/00264 123/142.5 R |
| 5,632,443 A * | 5/1997 | Quarrie | ................ | B60H 1/2209 237/12.3 C |
| 8,351,769 B2 * | 1/2013 | Kim | ........................ | F22B 1/284 219/523 |
| 8,515,268 B2 * | 8/2013 | Anliker | ................... | A47J 31/54 392/448 |
| 8,714,238 B2 * | 5/2014 | Won | ......................... | F02G 5/02 165/102 |
| 2009/0107974 A1 * | 4/2009 | Testa | ...................... | B60H 1/034 219/208 |
| 2011/0220317 A1 * | 9/2011 | Kidwell | ................. | G01K 17/10 165/11.1 |
| 2013/0206744 A1 * | 8/2013 | King | ...................... | F02N 19/10 219/208 |

* cited by examiner

*Primary Examiner* — Long T Tran
(74) *Attorney, Agent, or Firm* — Justin W. McCabe; Dunkiel Saunders Elliott Raubvogel & Hand, PLLC

(57) ABSTRACT

An auxiliary heating system comprising interconnected piping which forms a closed fluid flow circuit for permitting a passage of coolant therein, and having formed chamber openings along a length thereof to receive at least one heating element which projects into the closed fluid flow circuit to be in direct contact with, and heat, the coolant. A pump is provided for circulating the coolant, along with a flow switch for monitoring flow of the coolant through the closed fluid flow circuit, wherein if the flow has ceased through the closed fluid flow circuit, the flow switch instructs the system to deactivate the heating elements.

13 Claims, 3 Drawing Sheets

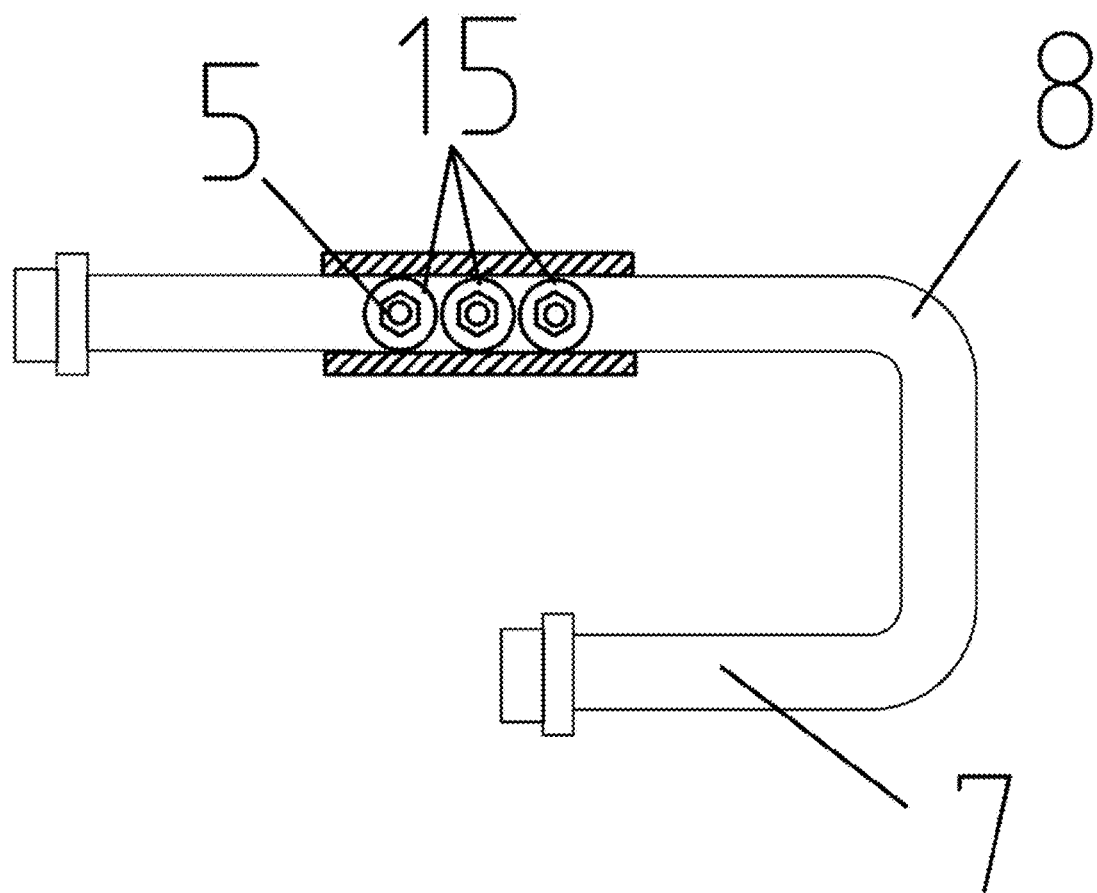

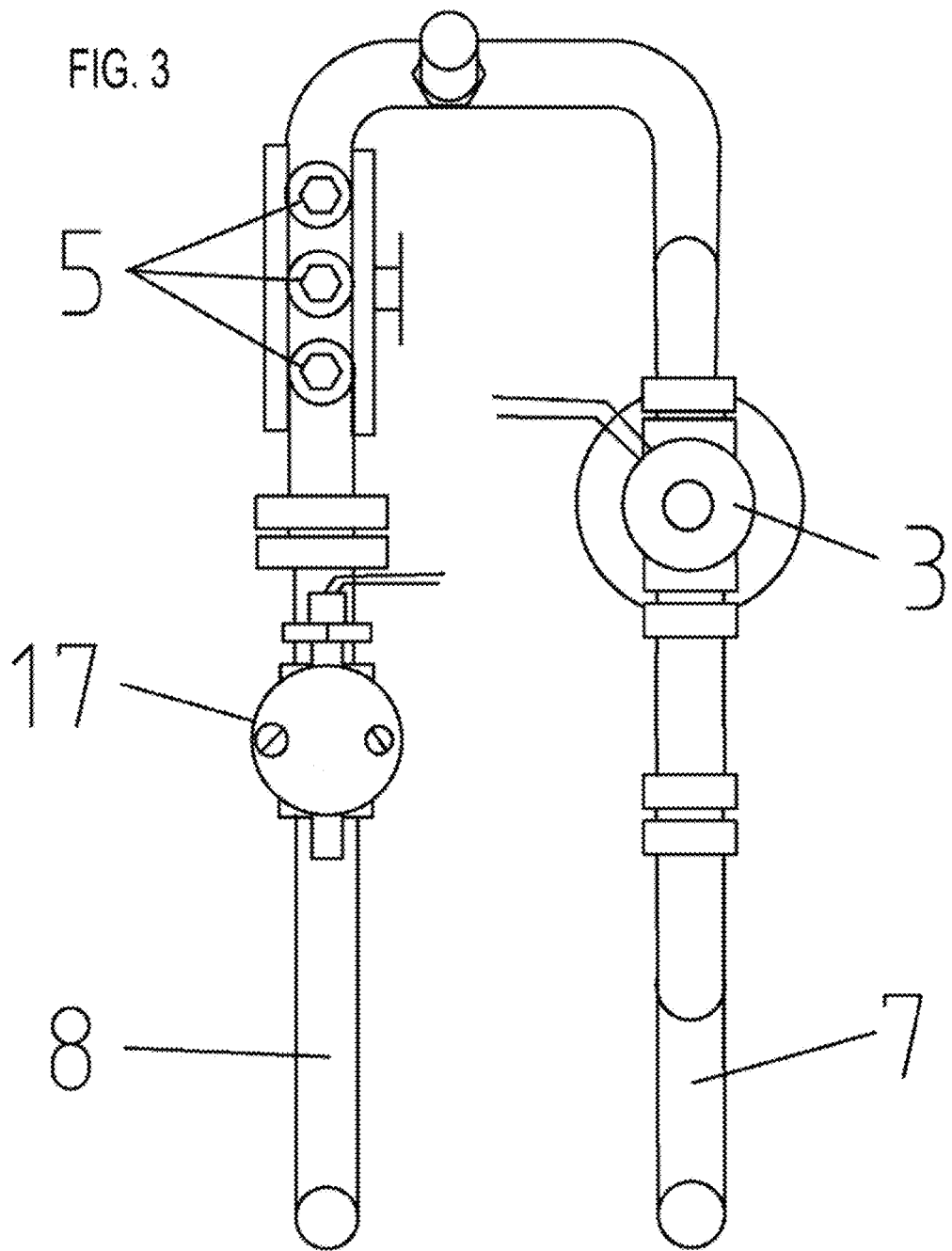

AUXILIARY HEATING SYSTEM

This invention relates generally to an auxiliary heating system, and more particularly to an improved auxiliary heating system for heating coolant, and having easily removable and replaceable heating elements that can be installed or removed easily from the auxiliary heating system. The auxiliary heating system is also preferably arranged as a continuous, interconnected flow circuit, therefore warming the coolant in a faster and more efficient manner.

DESCRIPTION OF THE PRIOR ART

It is well known that certain types of heating systems have utilized electrical elements internally positioned within a pre-heater, whereby coolant can be heated by the electrical element so as to heat an area. U.S. Pat. No. 5,408,960 (Woytowich) and U.S. Pat. No. 4,770,134 (Foreman et al) are examples of such devices. However, these arrangements feature electrical heating elements that are internally positioned and firmly set within a tank or chamber, and do not allow for easy removal of the electrical element from the pre-heater without complete disassembly, or destruction, of the pre-heater, should maintenance or replacement of the electrical element be required. In such maintenance or replacement situations, the entire pre-heater would be required to be removed from the heating system to access the internal electrical heating element, thereby making maintenance and replacement of such components difficult and complicated.

What is required is an auxiliary heating system which is very economical, possesses a minimal footprint, and which can generate substantial amounts of heat to heat larger spaces, such as in a home or business, and which can be utilized in various implementations and configurations, such as in a home, vehicle, radiant floor heating or various other uses. Thus, there is a need for an improved environmentally friendly heating system for heating a space which has a generally uncomplicated and simple design, which may be installed easily, and is durable and reliable, and which possesses easily removable or replaceable heating elements. In this regard, the present invention substantially fulfills this need.

SUMMARY OF THE INVENTION

It is an object of the present invention to provide an improved, environmentally friendly auxiliary heating system which has a generally uncomplicated and simple design, which may have easily removable and replaceable heating elements that can be installed or removed easily from within the system, and which can heat the coolant in a faster and more efficient manner.

It is another object of the present invention to provide an improved auxiliary heating system which is very economical, possesses a minimal footprint, and which can generate substantial amounts of heat to heat larger spaces, such as in a home or business, and which can be utilized in various implementations and configurations, such as in a home, vehicle, radiant floor heating or various other uses.

According to one aspect of the present invention, there is provided an auxiliary heating system constructed and arranged for interconnection with a power source for heating a space, comprising a first flow pipe and a second flow pipe, the first flow pipe and the second flow pipe being interconnected at ends thereof to form a closed fluid flow circuit for permitting a passage of coolant therein, the closed fluid flow circuit further comprising at least one opening defined therein separate from the first flow pipe and the second flow pipe; at least one heating element inserted into the at least one opening, the at least one heating element being removable without disassembly of the closed fluid flow circuit and having a lower end, the lower end being constructed and arranged for insertion into the at least one opening and projecting into the closed fluid flow circuit whereby the lower end is in direct contact with the coolant; and a pump for continuously circulating the coolant through the closed fluid flow circuit.

According to another aspect of the present invention, there is provided an auxiliary heating system constructed and arranged for interconnection with a power source for heating a space, comprising a first flow pipe and a second flow pipe, the first flow pipe and the second flow pipe being interconnected at ends thereof to form a closed fluid flow circuit for permitting a passage of coolant therein, the closed fluid flow circuit further comprising at least one opening defined therein separate from the first flow pipe and the second flow pipe; at least one heating element inserted into the at least one opening, the at least one heating element being removable without disassembly of the closed fluid flow circuit and having a substantially vertical upper stem body and a lower end, the lower end being constructed and arranged for insertion into the at least one opening and projecting into the closed fluid flow circuit whereby the lower end is in direct contact with the coolant; a flow switch for monitoring flow of the coolant through the closed fluid flow circuit, wherein if the flow has ceased through the closed fluid flow circuit, the flow switch instructs the system to deactivate the at least one heating element; a pump for circulating the coolant; and a power source constructed and arranged for connection to the at least one heating element, the flow switch and the pump to provide power thereto.

The advantage of the present invention is that it provides an improved, environmentally friendly auxiliary heating system which has a generally uncomplicated and simple design, which may have easily removable and replaceable heating elements that can be installed or removed easily from within the system, and which can heat the coolant in a faster and more efficient manner.

Yet another advantage of the present invention is to provide an improved auxiliary heating system which is very economical, possesses a minimal footprint, and which can generate substantial amounts of heat to heat larger spaces, such as in a home or business, and which can be utilized in various implementations and configurations, such as in a home, vehicle, radiant floor heating or various other uses.

BRIEF DESCRIPTION OF THE DRAWINGS

A preferred embodiment of the present invention is described below with reference to the accompanying drawings, in which:

FIG. 2 is an exploded view of an embodiment of the heating elements arranged to be positioned to reside within the formed chambers of the piping of the auxiliary heating system of the present invention; and FIG. 3 is an exploded view of an embodiment of at least some of the various components of the auxiliary heating system of the present invention.

DESCRIPTION OF THE PREFERRED EMBODIMENT

Figure 1:
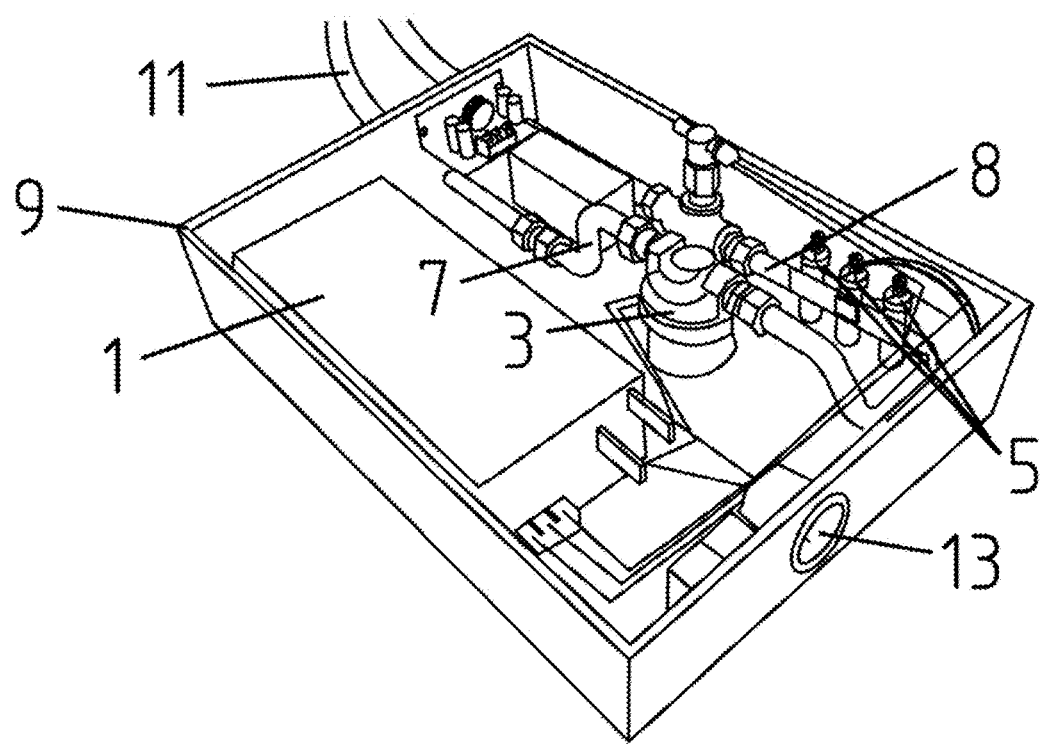
FIG. 1 is a perspective view of one embodiment of the auxiliary heating system of the present invention.

In the preferred embodiment, and with reference to FIG. 1, the heating system comprises various components, as hereinafter described, and which can include a power source 1, all of which may optionally be contained in a portable case 9 for ease of transport. Further, by virtue of the system having such a minimal footprint, the system can be interconnected for use with existing systems and hardware already present in, for example, a home, vehicle, radiant floor heating or various other uses, which would be readily understood by one skilled in the art. Such existing piping 11, as an example, can be seen in FIG. 1, and could be interconnected with first flow pipe 7 and a second flow pipe 8 shown in FIGS. 1 and 2.

The system comprises a first flow pipe 7 and a second flow pipe 8 which are interconnected to form a closed fluid flow circuit, through which coolant may flow. The closed fluid flow circuit will preferably be in a vacuum environment. A pump 3 is also utilized in the system to continuously circulate the coolant through the fluid flow circuit.

As can also be readily seen in FIG. 2, heating elements 5 are inserted through at least one integrally formed chamber opening 15 positioned along the length of interconnected piping, it being understood, of course, that such positioning can occur anywhere along a length of the interconnected piping, so that a lower end of the heating element 5 projects from the formed chamber opening 15 into the closed fluid flow circuit to be in direct contact with the coolant.

As can be seen in FIGS. 2 and 3, the interconnected piping extends substantially horizontally, and comprises at least one formed chamber opening 15, but more preferably, a plurality of formed chamber openings 15 defined thereon, each of which are separate from the separate from the first flow pipe 7 and the second flow pipe 8.

Preferably, the heating elements are DC electrical heating elements, though it is conceivable that other heating elements, such as glow plugs, could be utilized. These can be easily removable and replaceable if required. In a preferred embodiment, each of the formed chamber openings 15 will have an associated heating element 5 inserted therein. FIG. 1 illustrates 3 such removable heating elements 5 being utilized, though it will, of course, be understood that numerous variations to this number are possible.

The heating elements 5 are supplied with power from a power source 1 for enabling the heating elements 5 to heat the coolant within the fluid flow circuit. For example, some heating elements can be heated to 3500 degrees, or temperatures in varying other degrees, and this amounts to a considerable temperature which can be generated to heat the coolant flowing in the fluid flow circuit. In one embodiment, the power source 1 is an electrical type power source, or a power pack that can be plugged in by means of a power cord outlet 13, shown in FIG. 1, though it is conceivable that, alternatively, other types of power sources could be utilized, such as solar power cells, A/C power, DC power pack, wind generated power sources or the like, as would be apparent to one skilled in the art. Of course, it would be readily apparent that such a power cell could also be re-energized or re-charged also, as is also known in the art. The power from the power source 1 is connected to the heating elements 5, along with the pump 3 and the flow switch 17 (as hereinafter described) by conventional means such as wiring.

With reference to FIG. 3, the heating system further includes a flow switch 17 for monitoring flow of the coolant through the closed fluid flow circuit, wherein, if the flow has ceased through the closed fluid flow circuit, the flow switch 17 instructs the system to deactivate the heating elements to prevent damage to the heating elements 5.

In a further optional embodiment, the flow switch 17 may instruct, as an example, a thermostatic safety control (not shown) in association with the heating elements 5 and the other components therein, in a conventional known manner, and which would be adapted to turn the heating elements 5 off when a temperature of the coolant within the fluid flow exceeds a pre-determined level, or when it is detected that a component has failed. For example, if the pump malfunctions and is no longer circulating the coolant, or if there is insufficient coolant in the system, the thermostatic safety controls activates to shut down each of the heating elements 5. Additionally, the thermostatic control can be adapted to turn the heating elements on when a temperature of the coolant falls below a pre-determined level.

In an exemplary embodiment, radiator panels (not shown) can be connected to the fluid flow circuit, to radiate the heat from the heated coolant flowing in the fluid flow circuit to a space (not shown) to be heated by the heating system. Such a space could be, for example, a home, a room, radiant floor heating, an office or building, or the like.

It is conceivable that the present invention could be utilized, but not limited to, such applications as heating a greenhouse, use in vehicles, radiant flooring, heating an office or the like, or a home or building. In addition, it is also conceivable that a water source could also be interconnected with the closed fluid flow circuit of the present invention. Such a water source could be, as an example only, a water heater, which could be deactivated from operation, but which would provide sufficient quantities of water for the system. Other variations to this are possible also, as would be apparent to one skilled in the art. In another embodiment of the present invention, the heating system of the present invention can be a stand alone heating unit.

The heating system of the present invention could also be selectively activated (or deactivated) by a remote device (not shown) by a user, whereby the power source 1, activates the heating elements 5 from a distance. Of course, the system can also contain thereon a conventional on/off switch (not shown), as would be apparent to one skilled in the art.

The present invention has been described herein with regard to preferred embodiments. However, it will be obvious to persons skilled in the art that a number of variations and modifications can be made without departing from the scope of the invention as described herein. Such variations can include, but is not limited to, Homes and cottages—in-floor and in-wall heating assembly systems, and in terms protecting water supply from freezing; Radiated heating assembly mounted to aluminum or cast iron radiators; Radiated heating assembly in-floor heating and cement slabs; Heating homes on separate zones between floor and wall; Forced air systems, featuring uilt auxiliary heating assemblies in natural gas, oil or propane furnaces operating on solar, wind, lithium batteries and a generator; Heating assemblies in a free standing portable system which are easily transferrable from one application to another, and having snap on connections in various sizes; Railway switches, oil well heads, natural gas heads, mining applications, operations, and those using solar energy, wind energy, lithium batteries and a generator as power sources; Use in land vehicles such as heavy trucking, earth movers, transport trucks, buses, and light vehicles, for transferring the heat through the entire engine, inside the cab and to keep batteries completely charged; Marine Vessels—where the heating system generates heat through the entire vessel preventing mildew, mold and weakening of the inner structure; Industrial applications where the heating system is scalable to heat an industrial building, using solar, wind, lithium batteries and a generator, with zero emissions to exhaust; Applications such as heating hot tubs, swimming pools, tents, mobile homes, and trailers; Aviation applications, where the heating system is also designed to create heat on small engines; and use in operations at extremely cold temperatures of −40 and under.

I claim:

1. An auxiliary heating system constructed and arranged for interconnection with a power source for heating a space, comprising:
   a first flow pipe and a second flow pipe, the first flow pipe and the second flow pipe being interconnected at ends thereof, and without a housing therebetween, to form a closed fluid flow circuit for permitting a passage of coolant therein, the closed fluid flow circuit including at least one opening defined therein, wherein the at least one opening is disposed in a sidewall of the first flow pipe or the second flow pipe;
   at least one heating element inserted into the at least one opening, the at least one heating element being removable without disassembly of the closed fluid flow circuit and having a lower end, the lower end being constructed and arranged for insertion into the at least one opening and projecting into the closed fluid flow circuit whereby the lower end is in direct contact with the coolant; and
   a pump for continuously circulating the coolant through the closed fluid flow circuit.

2. The heating system of claim 1, further comprising a flow switch for monitoring flow of the coolant through the closed fluid flow circuit, wherein if the flow has ceased through the closed fluid flow circuit, the flow switch instructs the system to deactivate the at least one heating element.

3. The heating system of claim 1, further comprising heat transfer means connected to at least a portion of the closed fluid flow circuit, the heat transfer means being constructed and arranged for transferring heat from the coolant flowing in the closed fluid flow circuit to the space heated by the heating system.

4. The heating system of claim 2, further comprising a power source constructed and arranged for connection to the at least one heating element, the flow switch and the pump to provide power thereto.

5. The heating system of claim 4, further including a case, the case sized and configured to contain and transport the power source, the pump, the flow switch, the at least one unhoused heating element, and the uninterrupted closed fluid flow circuit.

6. The heating system of claim 1, wherein the at least one heating element is a glow plug.

7. The heating system of claim 1, wherein a thermostatic control is adapted to turn the at least one heating element on when a temperature of the coolant falls below a pre-determined level.

8. The heating system of claim 1, wherein the closed fluid flow circuit comprises a plurality of openings defined in a sidewall of either the first flow pipe or the second flow pipe or both, each having a heating element inserted therein.

9. The heating system of claim 1, wherein a power source is a power pack.

10. The heating system of claim 1, wherein a power source is an electrical battery.

11. The heating system of claim 1, wherein the at least one heating element has a substantially vertical upper stem body.

12. An auxiliary heating system constructed and arranged for interconnection with a power source for heating a space, comprising:
    a first flow pipe and a second flow pipe, the first flow pipe and the second flow pipe being interconnected at ends thereof, and without a housing therebetween, to form a closed fluid flow circuit for permitting a passage of coolant therein, the closed fluid flow circuit further comprising at least one opening defined therein, wherein the at least one opening is disposed in a sidewall of the first flow pipe or the second flow pipe;
    at least one heating element inserted into the at least one opening, the at least one heating element being removable without disassembly of the closed fluid flow circuit and having a substantially vertical upper stem body and a lower end, the lower end being constructed and arranged for insertion into the at least one opening and projecting into the closed fluid flow circuit whereby the lower end is in direct contact with the coolant;
    a flow switch for monitoring flow of the coolant through the closed fluid flow circuit, wherein if the flow has ceased through the closed fluid flow circuit, the flow switch instructs the system to deactivate the at least one heating element;
    a pump for circulating the coolant; and wherein
    the power source is constructed and arranged for connection to the at least one heating element, the flow switch and the pump to provide power thereto.

13. The heating system of claim 12, further including a case, the case sized and configured to contain and transport the power source, the pump, the flow switch, the at least one unhoused heating element, and the uninterrupted closed fluid flow circuit.

* * * * *